Oct. 15, 1940.    E. R. EVANS    2,218,379
CLUTCH DEVICE
Original Filed June 17, 1933    9 Sheets-Sheet 1

INVENTOR
EDWIN R. EVANS.
BY
ATTORNEY

Oct. 15, 1940.  E. R. EVANS  2,218,379
CLUTCH DEVICE
Original Filed June 17, 1933  9 Sheets-Sheet 2

Fig. 2

INVENTOR
EDWIN R. EVANS
BY
ATTORNEY

Oct. 15, 1940.　　　E. R. EVANS　　　2,218,379
CLUTCH DEVICE
Original Filed June 17, 1933　　9 Sheets-Sheet 4

INVENTOR
EDWIN R. EVANS.
BY
ATTORNEY

Oct. 15, 1940. E. R. EVANS 2,218,379
CLUTCH DEVICE
Original Filed June 17, 1933 9 Sheets-Sheet 5

Fig. 11

INVENTOR
EDWIN R. EVANS.
BY
ATTORNEY

Oct. 15, 1940.    E. R. EVANS    2,218,379
CLUTCH DEVICE
Original Filed June 17, 1933    9 Sheets-Sheet 8

INVENTOR
EDWIN R. EVANS.
BY
ATTORNEY

Oct. 15, 1940.                E. R. EVANS                 2,218,379
                             CLUTCH DEVICE
              Original Filed June 17, 1933      9 Sheets-Sheet 9

INVENTOR
*EDWIN R. EVANS.*
BY
ATTORNEY

Patented Oct. 15, 1940

2,218,379

UNITED STATES PATENT OFFICE 2,218,379

CLUTCH DEVICE

Edwin R. Evans, Orchard Lake, Mich.

Application June 17, 1933, Serial No. 676,269
Renewed February 20, 1939

21 Claims. (Cl. 192—105)

This invention relates to a clutch device and more particularly to power transmitting clutch devices suitable for use with motor vehicles, but which may be used for other purposes.

An object of the invention is to provide the clutch with a lockout device controlled by the usual foot pedal and providing manual or automatic control at the will of the driver.

Another object is to provide a simple and quick means for adjustment of the clearance between the driving and driven members of the clutch.

Another object is to insulate certain springs used in the clutch so that the same will not be adversely affected by heat.

Another object is to provide a clutch which may be full automatic yet controlled by the foot pedal and having a lockout device controlled independently of the foot pedal.

A further object is to provide a clutch in which a spring-pressed cam plunger and mating cam is used with the weights controlling the operation of the clutch in order to provide disengagement of the clutch at slower speed than engagement.

The invention consists substantially in the construction, combination, location and relative arrangement of parts, all as will be more fully hereinafter set forth as shown by the accompanying drawings and finally pointed out in the appended claims.

By way of illustrating the invention it will now be described as applied to a motor vehicle. It will be understood that the driving member of the clutch is connected to the engine and the driven member to any form of transmission, the driven shaft of which connects to the drive shaft of any suitable free wheeling device connected to the rear axle drive of the motor vehicle. While such free wheeling device is not absolutely necessary, it is desirable to use the same, and it will be assumed when reading the following specification that a free wheeling device is used, and as such free wheeling devices are well known, they are not herein described.

A purely automatic clutch will be disengaged normally and engaged only at a predetermined speed, and the full value of such a clutch is not obtained unless used in conjunction with a free wheeling device.

This will be understood by considering an automobile equipped with an automatic clutch, but without a free wheeling device. If such a car is driven at say 50 miles an hour and it is desired to shift from high to second gear, if the driver's foot is taken off the accelerator in order to shift the gears the car and engine will slow down, but the inertia of the car will proceed to drive the engine. The torque under this condition will be so great that the clutch will not release and it will be impossible to shift the gears, since the speed of the engine at 50 miles an hour is approximately 2500 R. P. M. in the average car and this speed is such that the automatic clutch will not release. If however, a free wheeling device is interposed in the drive shaft, the engine speed immediately decreases as soon as the driver takes his foot off the accelerator because the car cannot drive the engine and the shift may be rapidly made by the operator.

The above effect when no free wheeling device is used, is also present when attempting to shift from low to second and from second to high speed. It is therefore desirable to be able to use the conventional foot pedal with an automatic clutch for without it the principal advantage obtainable from the automatic clutch is merely the ability to drive without gear shifting (but only under certain conditions) and come to a full stop by braking without touching the clutch pedal.

In starting from a complete stop and making all of the gear shifts below a speed of approximately 15 miles per hour, an automatic clutch without a free wheeling device is fairly satisfactory, but in getting away in second gear, drivers often race their motors up to 2000 or 3000 R. P. M., at which speeds gear shifting is practically impossible except by the most expert driver who would be able to push this gear shift lever out in the extremely short time which elapses when control of the accelerator has caused the higher speed to drop off and the motor load and car momentum load balance.

It therefore becomes highly desirable to provide a clutch with which gears can be shifted under all conditions and in which the automatic feature can be controlled at the will of the driver. Preferably suitable means is provided to permit the automatic clutch to be used with conventional foot control by means of the ordinary foot pedal at the will of the driver, so that when the car is traveling at any speed that, by depressing the clutch pedal, the operation of the clutch can be controlled in the usual manner.

The following specification describes a clutch which is always under the control of the driver, irrespective of the speed of the engine or car, but which will function, if desired, as a full automatic clutch.

Referring to the drawings.

Figures 1, 5, 6, 7, 8:
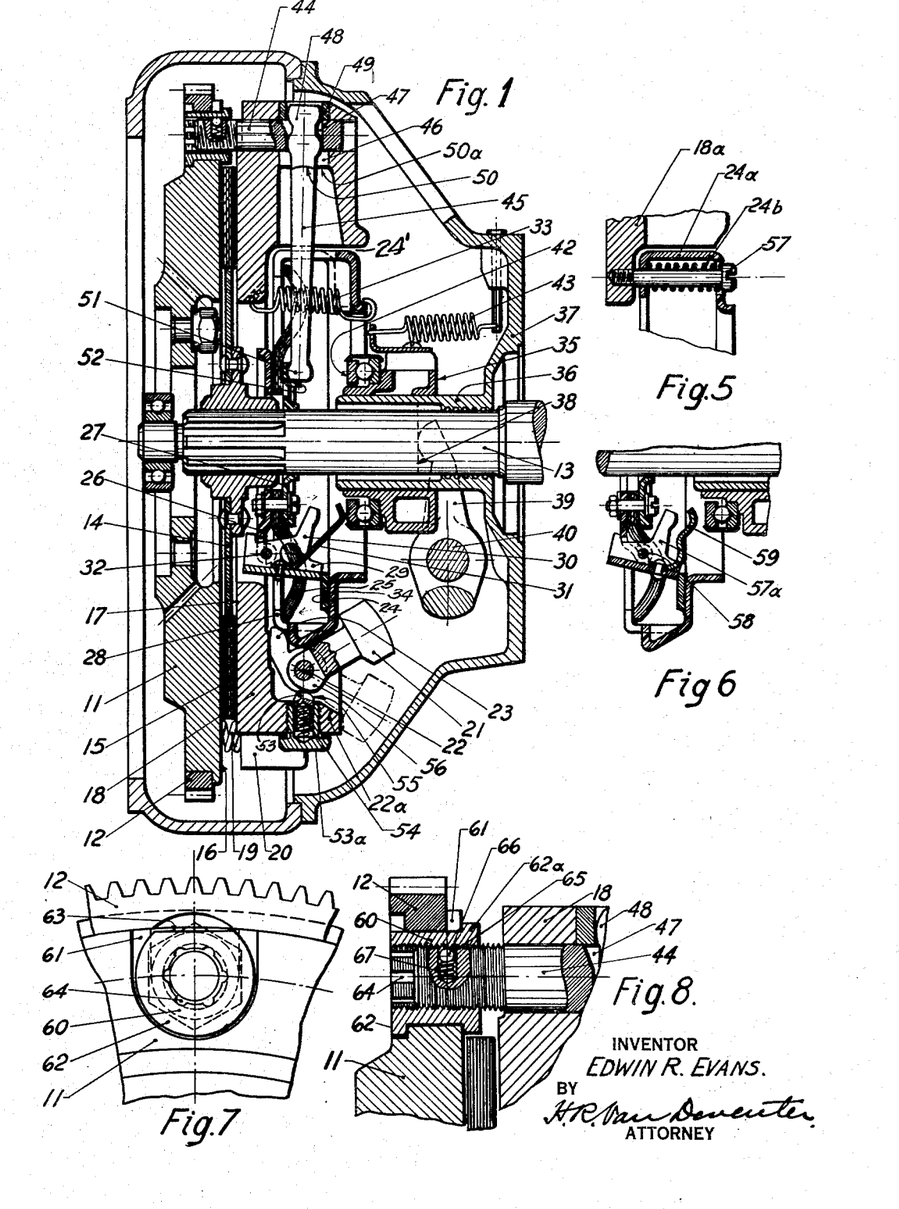
Fig. 1 is a vertical sectional view showing one form of the improved clutch constituting this invention in stopped or idling position with foot pedal normal and the clutch disengaged and under the control of the weights for automatic operation.
Fig. 5 shows an alternative form of cage retracting spring.
Fig. 6 shows an alternative latch construction.
Figs. 7 and 8 show details of the adjusting mechanism.
Figure 2:
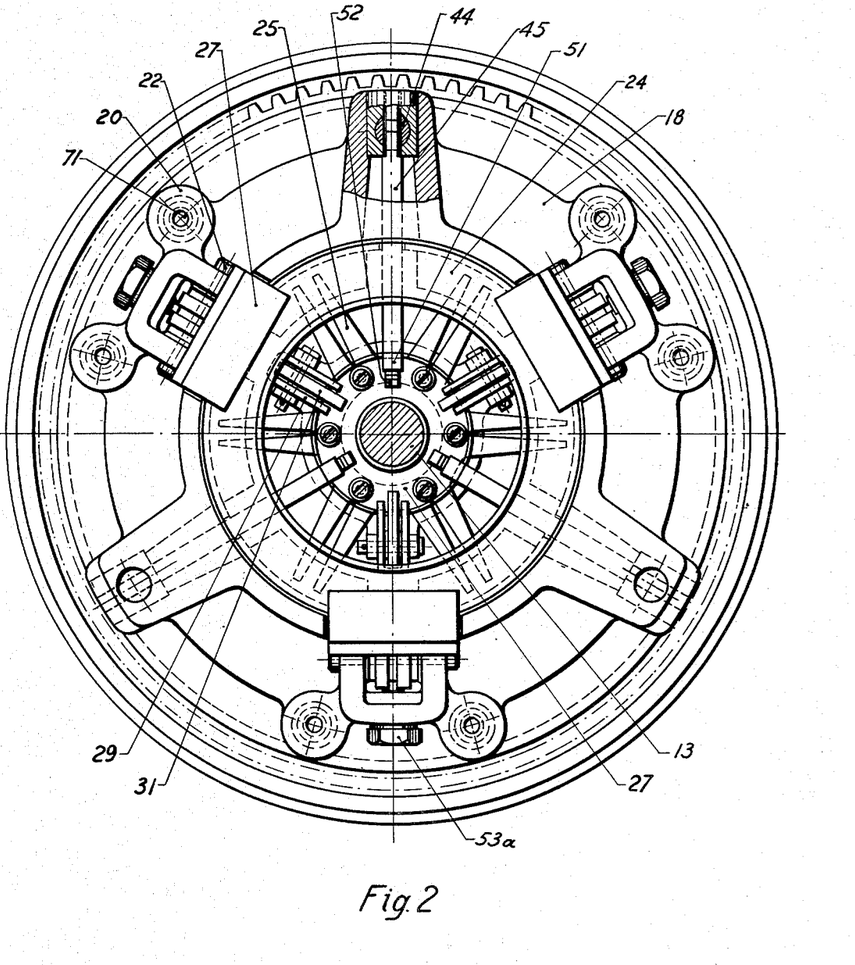
Fig. 2 shows the clutch (Fig. 1) viewed from the rear or transmission end.

Referring to Figs. 1 and 2, the numeral 11 denotes the usual flywheel adapted to be fastened to the motor shaft flange (not shown) by bolts in the usual manner. The flywheel carries a starter ring-gear 12.

A driven shaft 13 has splined thereto a flexible driven disk member 14 having friction facings 15 adapted to engage faces 16 and 17 of the flywheel 11 and a presser plate 18 respectively.

The presser plate 18 is normally urged away from the flywheel 11 by compression springs 19, retained in bosses 20 formed on the presser plate 18.

A series of weights 21, pivoted at 22 to the presser plate 18, have integral levers 23 which engage the rim of a cage or intermediate member 24. As best appears in Fig. 1, said cage is mounted in a circular chamber 24', laterally opening in the presser plate, and is adapted to float in such chamber along the clutch axis.

A plurality of radial laminated springs 25 are clamped between rings 26 and 27 forming a spring support so as to form a single spider and engage the flange 28 of cage 24 at their outer ends.

A plurality of latches 29, having inwardly directed extensions 30 and carrying leaf springs 31, are pivoted at 32 to the ring 26.

Tension springs 33 urge the cage 24 toward the presser plate 18. Shoes 34 fastened to the cage 24 are normally engaged by the latches 29 as shown in Fig. 1.

A collar 35, slidably carried on a projection 36 of the housing 37, has shoulders 38 engaging a yoke 39 on the usual clutch pedal shaft 40. The collar 35 carries a thrust ball bearing 42. A tension spring 43 holds the shoulders 38 of the collar 35 in engagement with yoke 39.

A plurality of pins 44 adjustably fastened in the flywheel 11, extend in sliding relation through the presser plate 18.

A plurality of finger levers 45, retained in slots 46 of the presser plate 18, are fulcrumed in slots 47 in the driving pins 44, having rounded ends 48 engaging bushings 49 in the presser plate 18. Shoulders 50 on the levers 45 engaging inner edges 50a of the slots 46, prevent the levers from moving radially under centrifugal force.

The inner ends 51 of levers 45 engage the spider ring 27, portions 52 of ring 27 being turned outward to form retainers, and centralizing means for the spring element assembly.

Plungers 53, slidable in bushings 53a, have springs 54 and are located in presser plate 18, and have cam faces 55 engaging cams 56 on weights 21, for a purpose hereafter described.

When the motor is idling (Fig. 1), the springs 19 hold the presser plate 18 away from the flywheel 11, keeping the surfaces 16 and 17 away from the driven friction facings 15 and urging the inner ends 51 of levers 45 against the ring 27. The tension springs 33 urge the cage 24 toward the left, holding the weights 21 swinging inward as shown, which permits the latches 29 to engage the shoes 34, thereby holding the spring spider ring 26—27 to the left against the initial pressure of springs 25 and holding the clutch open. Centrifugal force tends to retain the latches 29 outwardly swung, at all times during rotation of the fly wheel 11.

Figure 3:
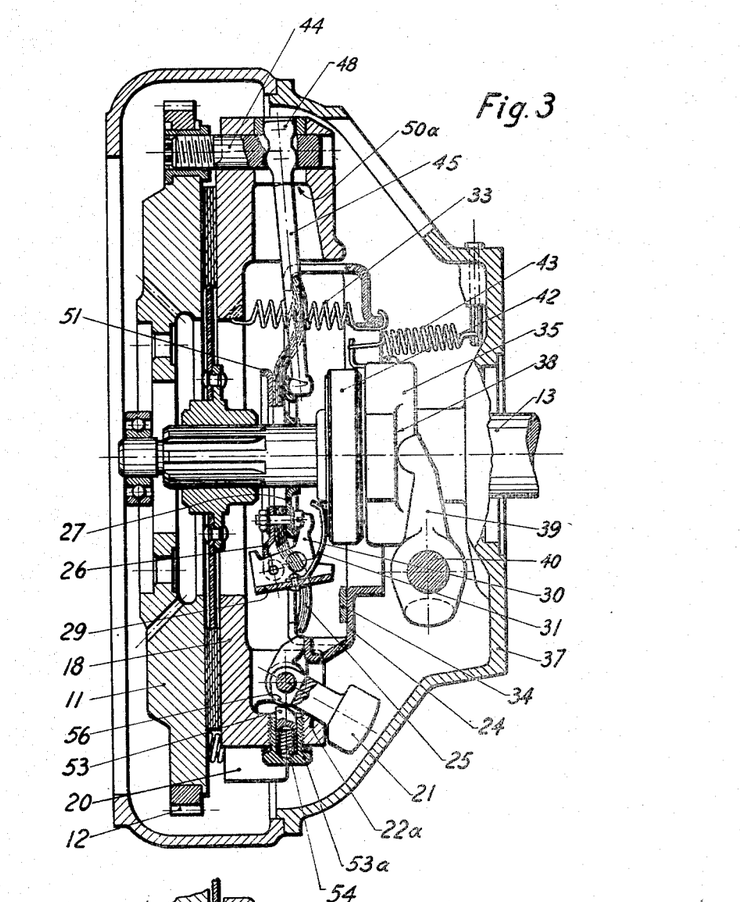
Fig. 3 is a vertical sectional view of the clutch (Fig. 1) in driving position for automatic operation foot pedal normal and clutch engaged.

As the engine speeds up, weights 21 swing outward under centrifugal force, as shown in Fig. 3. The weights 21 force the cage 24 to the right against the laminated springs 25, and acting through the latter and the ring 27, swing ends 51 of levers 45 to the right about their fulcrum in pins 44. The ends 48 of levers 45 are forced to the left, moving the presser plate to the left against the force of springs 19 thereby causing engagement of the driven disk facings 15 between surfaces 16 and 17 so as to start the car.

As the speed increases, the weights 21 continue to swing outward until they are stopped by the surfaces 22a of the presser plate 18, after which no further engaging force can be transmitted to the presser plate.

As the cage 24 is forced to the right, it moves ahead of the ring 26 owing to the flexing of laminated springs 25. Meanwhile the springs 31 on the extensions 30 have engaged the thrust bearing 42, lifting the latches out of engaging position with the cage shoe 34. As the speed falls in normal automatic operation, the latches 30 centrifugally drop back into engagement, and the cage springs 33 draw the cage and spring spider unit to the left as a unit, allowing the lower end of levers 45 to swing to the left as the springs 19 disengage the clutch surfaces. If however, the clutch pedal is slightly depressed, moving the thrust bearing to the left, the latches 29 are restrained from engaging the shoes 34, so that the ring 27 is held to the right by the laminated springs 25 and the clutch remains engaged. The action is now that of a conventional clutch. It is to be understood in this connection that the springs 25 are more or less distorted in all of their positions of use and their resistance to such distortion tends always to move their inner ends to the right.

Figure 4:
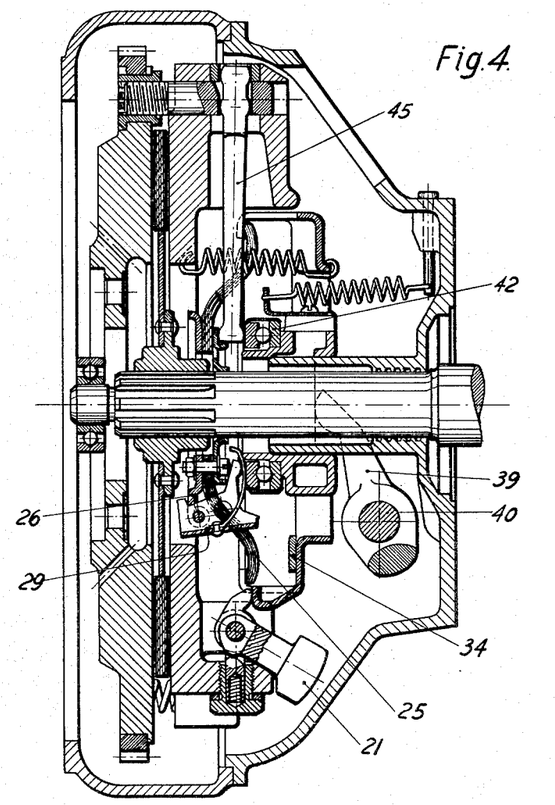
Fig. 4 is a vertical sectional view showing the clutch (Fig. 1) when disengaged by pressure on the foot pedal and with the lockout device set to permit full manual control.

To disengage the clutch, the pedal is fully depressed, as in Fig. 4. The thrust bearing bears directly on the ends 51 of levers 45, swinging them to the left and releasing the clutch in the usual manner.

In disengaging the clutch manually at fairly low speed or when stopped, the spring 31 is not strong enough to release the latch 29. In this case the thrust bearing 42 operates the latch directly through the upward extension 30 thereof.

To return to automatic operation, the car being in motion, it is only necessary to remove the foot from the pedal. As soon as sufficient speed has built up to bring the latch 29 behind the cage shoe 34, it is in position to drop in, thus returning to full automatic action as previously described.

The function of the spring-pressed cam plunger 53 is to cause the clutch to engage at higher speed than that at which disengagement takes place. In swinging outward to engage the clutch the weights 21 must depress the plunger through the cam 56, thus doing work on the spring 53a and in cam friction.

The contour of the cam 56 is such that at full engagement the plunger has run over the top of the cam swell. In order to disengage, it is necessary for the plunger to travel back over the swell of the cam, thus interposing a resistance to swing in of the weights 21, so that disengagement takes place at lower speed than engagement, the condition required for proper automatic clutch action.

In Fig. 5 the cage 24a is urged toward the presser plate 18a by compression springs 24b retained under screws 57 instead of by tension springs 43 as in Fig. 1.

The latch 57a shown in Fig. 6 operates in the same manner as that of Fig. 1, but is constructed with its fulcrum 58 farther to the right, that is, nearer the center of gravity of the latch, reducing the thrust necessary for unlatching, which effect is further promoted by the shape and fastening of spring 59.

In Figs. 7 and 8 the means of adjusting the clearance between clutching surfaces is shown in detail. In original assembly, internally threaded spools 60 are dropped into suitable notches 61 in the periphery of flywheel 11. The starter gear ring 12 is then forced into place, the flanges 62 of spools 60 being cut away on one side 63 to allow the ring to pass over them. The spools 60 are rotatable in the notches 61 under the ring 12, but are restrained from end motion by their flanges 62 and 62a, the latter of which are hexagonal. Splines on grooves 64 are cut in the threaded interiors of spools 60.

Each driving pin 44 contains a recess 65 in which is placed a ball 66 backed by a spring 67. In assembling, the threaded ends of pins 44 are brought to the ends of spools 60. The spools 60 are revolved by means of hexagonal flanges 62a, thus drawing in the pins 44 which are restrained from revolving by levers 45 (Fig. 1). As the balls 66 enter the spools 60 they drop successively into the splines 64, thus providing a "notching" adjustment by means of which all pins can be adjusted equally with ease and accuracy and by which the adjustment is held from slipping.

Figure 9:
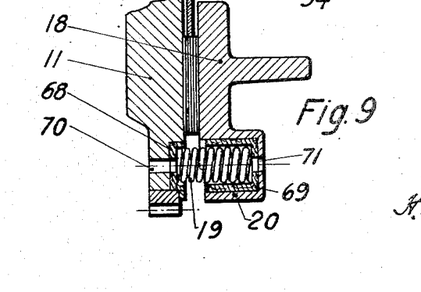
Fig. 9 is a detail view of the disengaging spring mounting.

In Fig. 9 the disengaging spring 19 is shown seated in a heat insulating cup 68 in flywheel 11 and surrounded by an insulating bushing 69 in the presser plate 18. These insulating means, of hard asbestos, or other suitable material, prevent frictional heat from the flywheel and presser plate from affecting the spring 19. Ventilating holes 70 and 71 further assist in keeping the springs cool.

Figure 10:
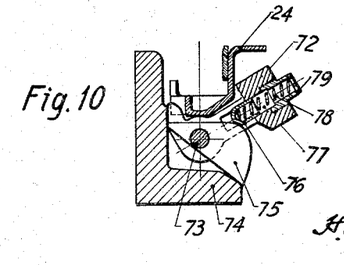
Fig. 10 is a view partly in section of a weight and cam, wherein the cam is held in the pressure plate of the clutch described by the weight pivot pin.

Fig. 10 shows a form of weight and cam in which the cam 75 is secured on the pressure plate 74 by the weight pivot pin 73, being held rigid by engagement of its ends with the pressure plate. A plunger 76 slidable in a recess 77 of weight 72 is pressed against the cam 75 by a spring 78 backed by plug 79. The action between plunger and cam is the same as previously described.

Figure 11:
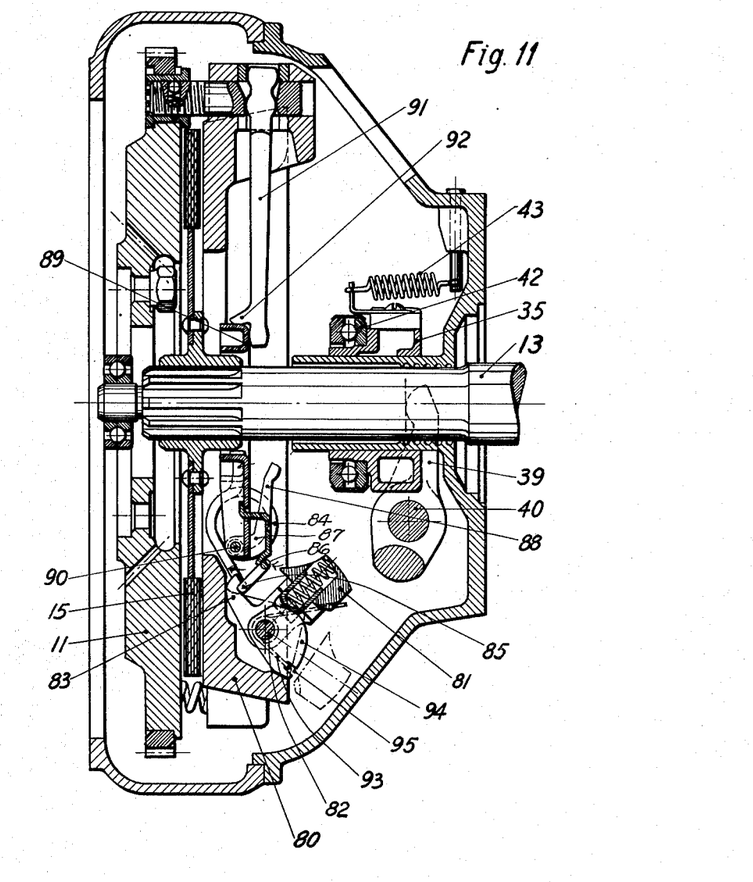
Fig. 11 is a vertical sectional view of a clutch in which coil springs are used (instead of leaf springs as shown in Fig. 1) in disengaged position, with foot pedal normal and the clutch under control of the weights for automatic operation.
Figure 12:
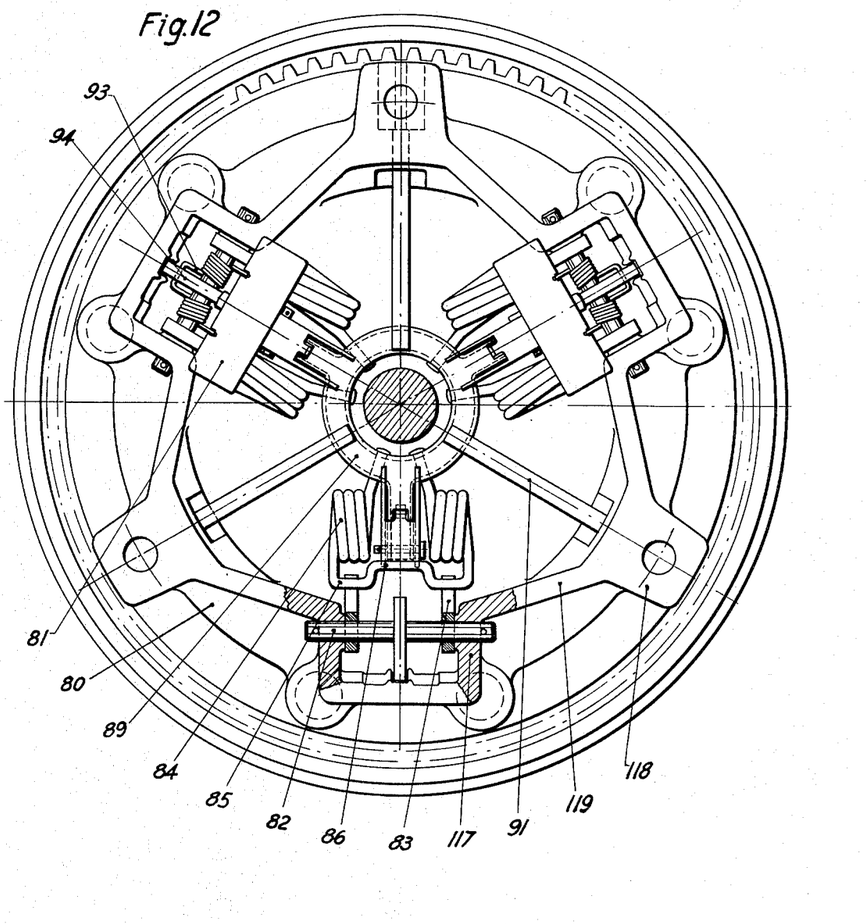
Fig. 12 shows the clutch (Fig. 11) viewed from the rear or transmission end.
Figure 13:
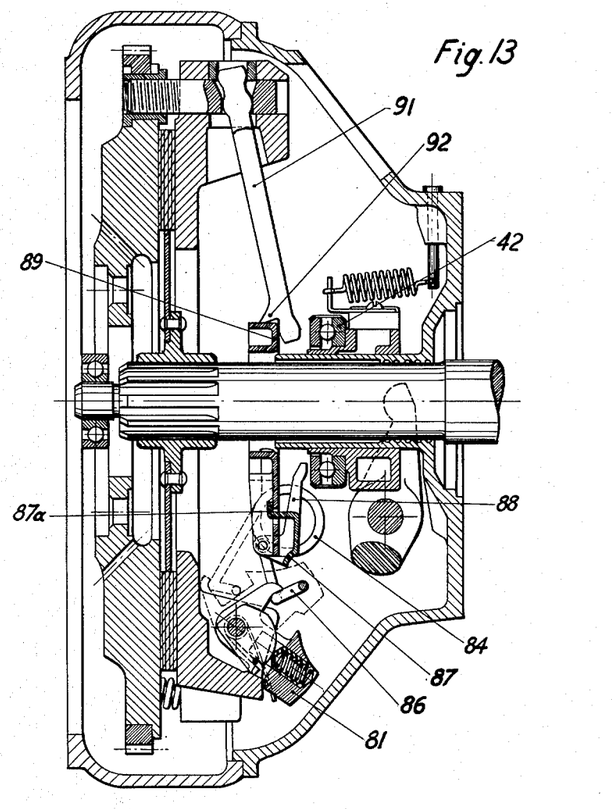
Fig. 13 is a vertical sectional view of the clutch (Fig. 11) in driving position for automatic operation, foot pedal normal and clutch engaged, the clutch under control of the weights for automatic operation.

In Figs. 11, 12 and 13 a form of clutch is shown in which the leaf springs 25 (Fig. 1) are replaced by coil springs 84 equally spaced, around a retaining plate 89 which latter also acts as an actuating pressure member for levers 91. The centrifugal weights 81 have extensions 83 which directly engage loops 85 of springs 84, thus eliminating the cage heretofore described.

Latches 87 pivoted to plate 89 at 90 normally engage portions 86 of springs 84 thus preventing the latter from incoiling in a clockwise direction, Fig. 11. The springs 84 support the plate 89 substantially coaxially with the shaft 13, the inner ends of such springs being secured to said plate, as best appears in Fig. 12. Engagement with the latch extensions 83 holds said springs in place.

The weights 81, pivoted to pressure plate 80 by pin 82, are urged inward by torsion springs 93 which also engage notches 95 in the cams 94 thus urging the latter outward against the plate 80.

As stated, the latch 87 normally prevents the springs 84 from unwinding in a clockwise direction, and as the weights 81 travel outward under centrifugal force they act directly through the springs 84, forcing the plate 89 and the inner ends of levers 91 to the right and engaging the clutch as shown in Fig. 13.

It will be noted that in this action the portion 86 of spring 84 swings clear of latch 87. If latch 87 is not raised by normal means, as the engine slows down and the weights 81 swing inward, end 86 of the spring 84 will drop back into engagement with latch 87, and the parts return to the position of Fig. 11, giving automatic disengagement. If however, the foot pedal is slightly depressed so as to cause thrust bearing 42 to engage extension 88 of latch 87, thus raising the latter, the spring portion 86 fails to engage 87, as the weights swing inward. At all times, when the fly wheel is rotating, centrifugal force tends to hold the latch members 87 in outer limiting or effective positions.

The springs 84 uncoil in a clockwise direction, holding the levers 91 to the right and keeping the clutch in engagement as previously described until it is either thrown out manually or the latches allowed to drop in by removing the foot pedal pressure and speeding up the engine.

The levers 91 in Figs. 11, 12 and 13 have steps or extensions 92 engaging plate 89 to provide radial spacing.

Extensions 87a on latches 87 engage plate 89 so as to prevent the latches from swinging too far outward under centrifugal force.

Figures 14, 15, 16, 17:
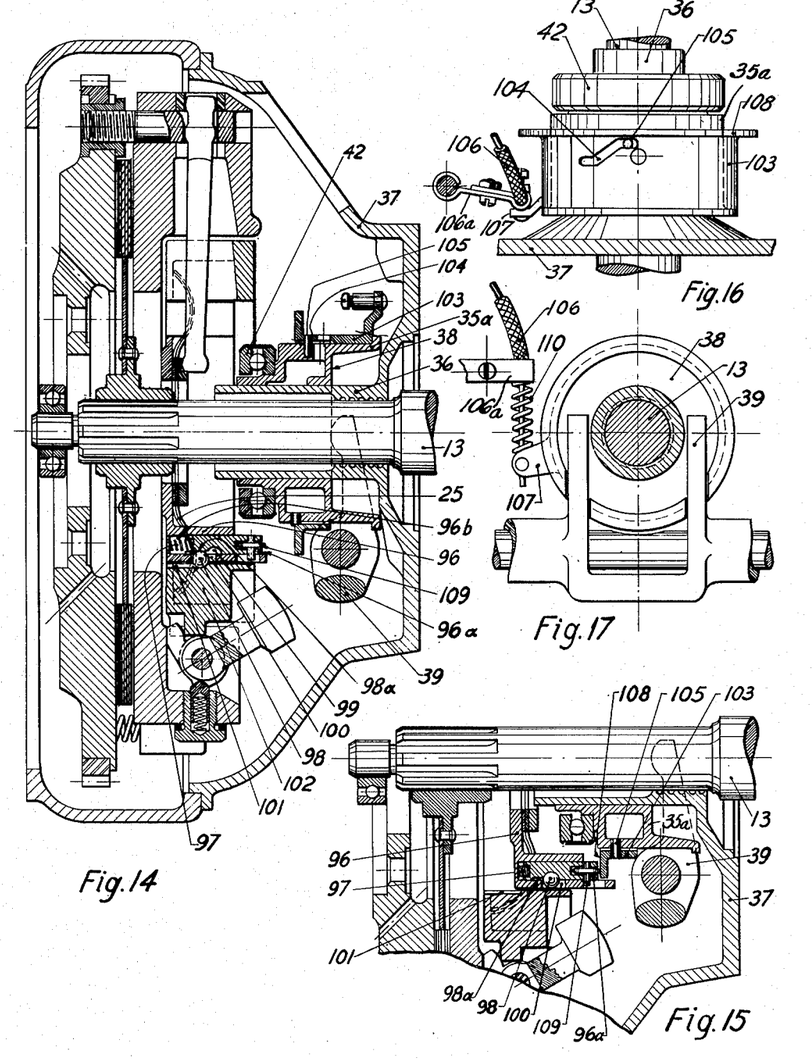
Fig. 14 is a vertical sectional view of an alternate form of the clutch (Fig. 1) but with a manual control other than the foot pedal, for operating the lock-out device. This figure shows the clutch disengaged and under the control of weights for automatic operation.
Fig. 15 is a sectional view of part of the clutch (Fig. 14) showing the clutch engaged through operation of the manual control.
Figs. 16 and 17 show details of the manual control shown in Figs. 14 and 15.

In Fig. 14 a form of clutch is shown in which the spring holder ring 96 is a cast or forged member carrying a series of latches 96a employing balls 98 as engaging members. The latch 96a is slidable in a recess 96b in the plate 96, and is normally urged to the right by a spring 97. A groove 98a in latch 96a terminating in a depression 99 receives the ball 98, which latter protrudes downward through a slot 100 in plate 96 so as to engage a groove 101 in the cage member 102. The latter is annular and its large central opening freely accommodates the ring 96 to guide such ring in travel along the clutch axis. The cage member is freely fitted in a circular chamber laterally opening in the presser plate, and is thus retained in a coaxial relation to the clutch.

In Fig. 14, the plate 96 which is urged to the right by the springs 25 bearing against cage 102, is restrained from moving by the ball 98 engaging the end of groove 101 and end of slot 100.

In Figs. 16 and 17 are shown details of a sleeve 103 partly rotatable on the releasing collar member 35a. Sleeve 103 has diagonal slots 104 engaging pins 105 fixed in the collar 35a, so that rotation of sleeve 103 causes it also to move longitudinally on 35a.

A Bowden wire mechanism 106, comprising a supporting bracket 106a for the wire, connects a lug 107 of sleeve 103 with a manual control handle (not shown).

When the Bowden wire is drawn out manually, the sleeve 103 moves forward on the collar 35a, bringing the flange 108 almost into engagement with rollers 109 on the latches 96a, the clutch being in idling position. As the foot pedal is then depressed, the flange 108 engages the rollers 109, forcing the latches 96a ahead and allowing balls 98 to drop into the depressions 99 as shown in Fig. 15. This frees the ends of grooves 101, releasing plate 96 from cage 102, and thus allowing springs 25 to hold the clutch engaged, upon release of the clutch pedal in the manner previously described. The action of said springs in shifting the plate 96 to the right, as per Fig. 15, is due to fact, hereinbefore stated, that distortion of said springs is relieved in proportion as their inner ends are permitted to move to the right.

The clutch is now in manual position, the Bowden wire being released.

To return to automatic operation, the engine is speeded up until the weights are fully thrown out, and the Bowden wire mechanism is pulled out, compressing the spring 110 as before and moving the collar 103 forward. The pedal is then depressed and the Bowden wire released. Centrifugal force now has thrown the balls 98 out of depressions 99, so that as the collar 103 is withdrawn the latches 96a return to their original position, balls 98 locking against the ends of grooves 101. The pedal having been released, the clutch is again in automatic operating position.

The presser plate 80 (Fig. 12) has a plurality of circumferentially spaced extensions 117 adapted to support the pins 82 carrying the weights 81 and also has a plurality of driving pin supports 118 circumferentially spaced between said extensions, and a strengthening rib 119 connecting said extensions and supports.

Figure 19:
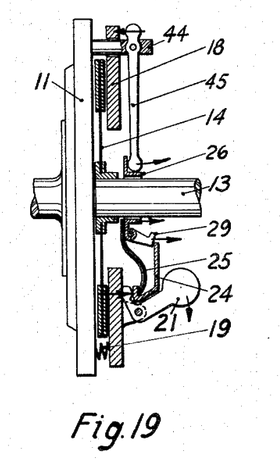
Figs. 19, 20 and 21 are simplified diagrams illustrating the operation of the clutch shown in the other figures.
Figure 20:
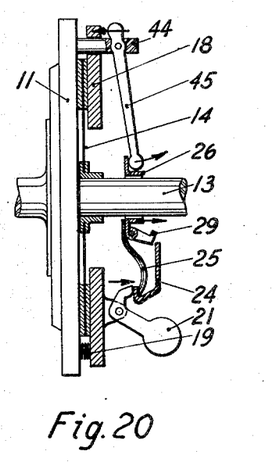
Figure 21:
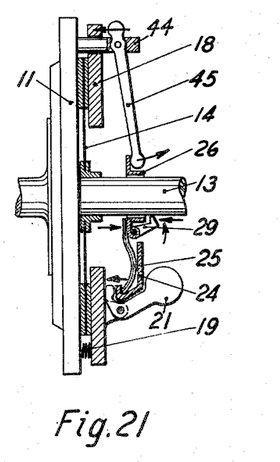

Figs. 19 to 21 inclusive are simplified diagrams illustrating the operation of the clutch shown in Figs. 1 to 4 inclusive. The clutches shown in Figs. 11 to 13 operate in the same manner, the only difference being in structure, the cage 24 being omitted.

Fig. 19 shows the clutch at rest or in idling position, the clutch being disengaged and the position of the parts in this diagram corresponding with those shown in Fig. 1.

The springs 19 have caused the separation of flywheel 11 and presser plate 18, and consequently the driven member 14 of the clutch is disengaged.

The latch 29 is in locked position as shown, thereby disabling springs 25 which are held between rings 26 and the cage 24. In other words, this latch 29 merely short-circuits or bridges the springs 25 and renders them inoperative, although the springs are partially flexed with the latch in the locked position as shown.

As the clutch speeds up, the parts assume the relative position shown in Fig. 20 and the clutch engages as the clutching surfaces of the flywheel 11 and plate 18 grip the friction surfaces on the driven member 14.

The weights 21 are moved outwardly due to centrifugal action and have forced the cage 24 outwardly which has increased the flexure of springs 25, the cage being free to move away from latch 29 as shown.

The force of the weights is consequently applied through springs 25 to the floating rings 26 and through the finger levers 45 fulcrumed in pins 44 to the presser plate 18 thereby compressing the springs 19 and forcing the presser plate towards the flywheel 11, the driven member 14 of the clutch being gripped and held between the presser plate and the flywheel.

The reason for placing the springs 25 in initial flexure is to cause them to apply a predetermined driving load to the engaging surfaces as soon as the weights pick up the springs 25 and move the surfaces into contact. This reduces the necessary movement of the weights and causes them to add only a relatively small loading to the initial flexure of the springs 25, thus keeping down the effort necessary for manual disengagement at high speeds. This action also permits the application of ample unit pressures to the engaging surfaces at low speeds without causing dangerously high pressures at high speeds, thus preventing injury to the clutch facings.

It will be noted that the springs 19 act against the springs 25, but are necessary to insure disengagement and to prevent rattle. The springs 19 by opposing springs 25, also assist the driver in manually disengaging the clutch.

The foregoing Figs. 19 and 20 therefore show the idling or disengaged position of the clutch and the engaged or running position thereof under automatic control.

Referring now to Fig. 21, the clutch is shown at rest or idling, but with the latch 29 pushed out by the foot pedal or other manual control such as the Bowden wire arrangement shown in Figs. 16 and 17. With the latch out as shown, springs 25 are released so that they can apply pressure to the finger levers 45 thereby holding the clutch in engagement independent of the position of weights 21.

Now assuming that the speed of the clutch increases, weights 21 move to the position in Fig. 20, and the latch 29 will automatically lock in, provided it is not held out by a manual means.

It will be obvious from the study of Fig. 21 that the clutch therein shown may be operated solely as a manually controlled clutch, no use being made of the weights 21 so long as the latch is held out of operative position as shown, but if it is desired to have the clutch operate automatically or part of the time as an automatic clutch and part of the time as a manual clutch, the change may be automatically accomplished by merely taking the foot or hand off the manual control in order to permit weights 21 and latch 29 to operate as shown in Figs. 19 and 20.

Figure 18:
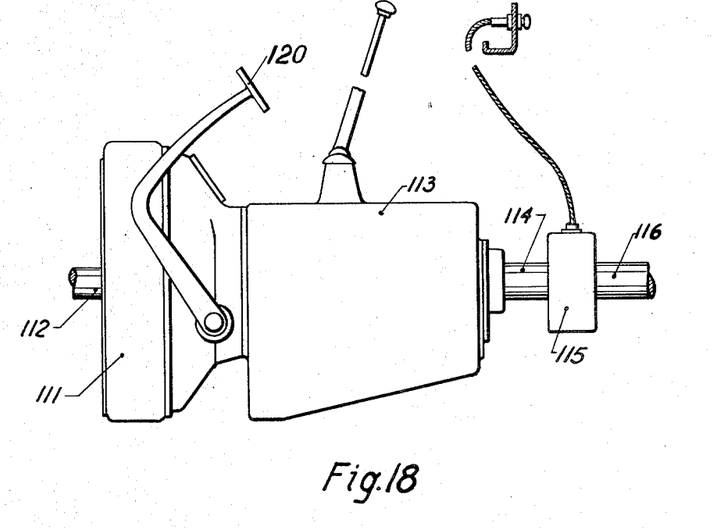
Fig. 18 is a diagrammatic view illustrating the combination of the improved clutches herein described with an automobile transmission and free wheeling device, the latter being any suitable form of device which will permit the car to overrun the engine.

Fig. 18 shows an improved clutch of any one of the forms herein described, the same being generally denoted by the numerals, 111, connected by a drive shaft 112 with an automobile engine, the driven shaft of the clutch extending into and being connected with the usual transmission indicated by 113 which may be of any suitable type. The driven shaft 114 of the transmission is connected to the free wheeling device 115, and the automobile drive shaft 116 is connected to the driven end of this device.

In this combination of elements the operative characteristics constituting one of the objects of the invention is obtained, for with a clutch of the type described, it is possible to use the conventional foot pedal 120 operating the clutch in the usual manner while at the same time the clutch may be used as an automatic clutch under the control of the accelerator.

From the foregoing description it is obvious that the foot pedal 120 has three operating positions, namely, fully retracted position wherein the clutch operation is automatic, partially depressed position in which the latches 29 are held open, thus preventing disengagement of the clutch, and fully depressed position wherein the clutch is disengaged by direct action on the levers 45.

Although the inventiton has been disclosed in connection with the specific details of preferred embodiments thereof, it will be understood that such details are not intended to be limitative of the invention except insofar as set forth in the accompanying claims.

What is claimed is:

1. In a clutch having driving and driven elements, power means operating through interposed radiating leaf springs mounted on a supporting ring, and levers for causing engagement of said driving and driven elements.

2. In a clutch having driving and driven members, levers adapted to bring about the engagement of said members, an intermediate member, springs interposed between said levers and said intermediate member, locking means between the intermediate member and said levers and manual means for directly operating said levers whereby the engagement of said driving and driven members may be controlled.

3. In a clutch having driving and driven members, levers adapted to bring about the engagement and permit disengagement of said members, centrifugal means adapted to operate said levers, and radiating leaf springs mounted on a supporting ring interposed between said last means and said levers.

4. In a clutch having driving and driven members, a plurality of studs extending from said driving member, a plate slidably mounted upon said studs, a spring acting to hold the driving and driven members apart, a plurality of weights mounted on said plate adapted when the clutch is rotated to force said plate towards said driving member to engage and hold said driven member between the opposed faces of said driving member and plate, spring means adapted to transmit said force and locking means for opposing the action of said spring means.

5. In a clutch having a driving and driven member, a plurality of movable weights, a retaining plate, a latching device, a plurality of coiled springs adapted to be engaged by said weights and said latching device, said springs having ends secured to said plate, and levers adapted to be moved by said plate to cause said driving and driven members to engage.

6. In a clutch adapted for engagement and disengagement, a plurality of radiating finger springs mounted on a supporting ring, each spring comprising a plurality of leaves, and means in said clutch including a plurality of movable weights adapted to increase the tension of said springs and thereby bring about the engagement of said clutch.

7. In combination, a source of power, a clutch having a driving member connected thereto, a driven member in said clutch, centrifugally controlled means for bringing about the engagement and disengagement of said members, and a foot pedal connected to said clutch and designed to operate the same and having a fully retracted position permitting said clutch to be operated by said centrifugally controlled means, and a partially depressed position adapted to prevent the disengagement of said clutch, and a fully depressed position wherein said pedal causes the disengagement thereof.

8. In combination, a rotatable clutch having rotatable, relatively movable, clutch engaging elements, latching mechanism between said elements in said clutch adapted to be urged toward latching position to prevent transmission of a drive through the clutch below a predetermined rotative speed, means for establishing a drive through the clutch when the clutch is revolved above a certain rotative speed, a foot pedal adapted to engage and disengage the clutch, and a separate manually controlled device for establishing the latch in its non-latching position.

9. A clutch comprising driving and driven members, a spring for establishing said members in driving engagement, and a lever transmitting the effort of said spring to said members, and means for automatically imposing an increased stress on said spring upon a predetermined speed increase in the driving member.

10. In a clutch, as set forth in claim 9, a member manually effective on the lever to overcome said spring.

11. A clutch for use with an internal combustion engine, comprising in combination, driving and driven members normally disengaged substantially at engine idling speed, spring means for applying drive-establishing pressure to said members, a pair of elements movable along the clutch axis and coacting to receive the thrust of the spring means, one of said elements being adapted to transmit such thrust, substantially unmodified, to the driving and driven members, levers adapted to multiply the thrust received by the other element, means for transmitting the multiplied thrust to the driving and driven members, and centrifugal means acting on one of said elements for automatically increasing the drive-establishing pressure on the driving and driven members as the speed of rotation increases and reducing such pressure as such speed is reduced to idling speed.

12. A clutch for use with an internal combustion engine, comprising in combination, driving and driven members normally disengaged substantially at engine idling speed, spring means for applying drive-establishing pressure to said members, a pair of elements movable along the clutch axis and coacting to receive the thrust of the spring means, one of said elements being adapted to transmit such thrust, substantially unmodified, to the driving and driven members, levers adapted to multiply the thrust received by the other element, means for transmitting the multiplied thrust to the driving and driven members, and centrifugal means acting on one of said elements for automatically interengaging the driving and driven members as the speed of rotation increases and to automatically disengage such members upon resumption of a substantially idling speed.

13. A clutch comprising driving and driven members, spring means for imposing a drive-establishing pressure on such members, levers adapted to multiply such pressure, a member transmitting the thrust of said spring means to such levers, and latch means mounted on the thrust-transmitting member for overcoming said spring means.

14. A clutch as set forth in claim 13, said thrust-transmitting member being movable along the axis of the clutch.

15. A clutch comprising a driving member, a presser plate movable to and from the driving member, a driven member disposed between the driving member and presser plate, a drive pin for the presser plate, carried by the driving member, a lever fulcrumed on said pin for applying multiplied pressure to the presser plate, said lever having an inner end portion, manual actuating means for such lever, and means centrifugally acting on the presser plate through said lever and taking effect on the inner end portion of the lever to automatically increase pressure on such plate as the speed of rotation of the driving member increases.

16. A clutch comprising a driving member, a presser plate movable to and from the driving member, a driven member disposed between the driving member and presser plate, a lever carried by the driving member and having an inner end portion, means for driving the presser plate, manual actuating means for such lever, and means centrifugally acting on the presser plate through said lever and taking effect on the inner end portion of the lever to automatically increase pressure on such plate, as the speed of the driving member increases.

17. In a clutch as set forth in claim 16, spring means urging the presser plate toward the driven member.

18. A clutch comprising a driving member, a presser plate movable to and from the driving member, a driven member disposed between the driving member and presser plate, a lever carried by the driving member, means for driving the presser plate independently of the lever, manual actuating means for such lever, and means positioned substantially at the periphery of the driving member acting centrifugally on the presser plate through at least a portion of the lever to automatically increase pressure on such plate, as the speed of the driving member increases.

19. In a clutch having driving and driven elements, power means operating through at least a portion of an interposed multiple finger spring element to cause engagement between said elements, the finger springs of said element radiating from and being connected by an annular member, and means for causing disengagement of said elements.

20. In a clutch having driving and driven members, levers adapted to effect engagement and permit disengagement of the driving and driven members, and means, including leaf springs mounted on and radiating from a supporting ring, for actuating said levers to engage the driving and driven members responsive to a predetermined increase of speed.

21. In a clutch having driving and driven members, power means operating through at least a portion of an interposed member having multiple spring elements radiating from and connected by an annular member and tending to increase engagement pressure of the driving and driven members, and means for causing disengagement of the driving and driven members.

EDWIN R. EVANS.